United States Patent

[11] 3,620,594

[72] Inventor William E. Humphrey
Oakland, Calif.
[21] Appl. No. 835,680
[22] Filed June 23, 1969
[45] Patented Nov. 16, 1971
[73] Assignee Optical Research and Development Corporation
Oakland, Calif.

[54] OPTICAL STABILIZER HAVING HYDRAULICALLY MOVED LIGHT-DEFLECTING LENSES
22 Claims, 11 Drawing Figs.
[52] U.S. Cl. .................................................... 350/16
[51] Int. Cl. .............................................. G02b 23/00
[50] Field of Search .......................................... 350/16;
356/148; 74/5; 95/12.5

[56] References Cited
UNITED STATES PATENTS
2,460,836 2/1949 Lovins ........................... 356/249
2,490,873 12/1949 Johnson ........................ 350/199 UX
3,084,443 4/1963 Kaatz et al. .................... 350/16 UX
3,434,771 3/1969 Alvarez ......................... 350/16

Primary Examiner—David Schonberg
Assistant Examiner—Toby H. Kusmer
Attorney—Townsend and Townsend

ABSTRACT: An optical stabilizer consisting of at least one neutrally buoyant lens supported in a transparent fluid bath along the optical path of a lens system. The fluid bath is enclosed within a casing, the casing being transparent at the points where it intercepts the optic path. The bath is provided with a circuitous path and its inertia moves the lens across the optical path to deflect the light passing through the lens equal and opposite to the accidental angular motion of a lens system.

PATENTED NOV 16 1971 3,620,594

WILLIAM E. HUMPHREY
INVENTOR.

BY

Townsend and Townsend

INVENTOR.
WILLIAM E. HUMPHREY
BY
Townsend and Townsend

WILLIAM E. HUMPHREY
INVENTOR.

BY

Townsend and Townsend

WILLIAM E. HUMPHRY
INVENTOR.

BY
Townsend and Townsend

OPTICAL STABILIZER HAVING HYDRAULICALLY MOVED LIGHT-DEFLECTING LENSES

This invention relates to optical stabilizers for eliminating the adverse effects of accidental angular motion on lens systems. More particularly, an optical system is set forth which utilizes fluid supported and moved optical lens or lenses interior of a lens system to provide stabilizing light deflection equal and opposite to the accidental angular motion of the lens system.

Optical stabilizers having optical elements which move across to the optic path are known. Typically, these stabilizers move one optical element relative to a second optical element so that the combined deviation of both elements deflects light in a direction equal and opposite to that deflection produced by accidental angular motion. Virtually all known stabilizers of this variety have included mechanically supported and moved lens elements.

Mechanically supported and moved lens elements require complex inertial mechanisms such as gyroscopes, gimbal-mounted elements and the like to effect the desired compensating motion of the deflecting lens elements. Such complex inertial mechanisms have linkages which can only be built around the optical path of the instrument with considerable difficulty. Moreover, these complex inertial elements, together with their auxiliary power supplies, motors, and the like, impart to the stabilizing lens train and casing a considerable mass, seriously limiting their application. Additionally, gyros require costly and precise balancing of their rotors.

An object of this invention is to utilize a simple fluid circuit to move a buoyantly supported lens or lenses across an optic path. A transparent fluid bath is confined within a casing to a circuitous path. This path has a segment of its length crossing the optic axis of a lens system. The lens or lenses are buoyantly supported for movement within the bath at this segment. Transparent walls are affixed to the casing for permitting light to pass therethrough along the optic axis and through the supported lens or lenses. By the expedient of designing the optical elements and fluid circuit within the limitation of the following equation:

$$1 = 2AK \div f_c \oint_0^p \frac{a_l}{a_p} dp$$

P  is the perimeter of the fluid circuit,

A  is the area enclosed by the perimeter of the fluid circuit on a plane including the optic axis and extending parallel to the direction of fluid flow in the segment in which the lens element is supported, $a_l$  is the area of the fluid circuit in the vicinity of the supported lens or lenses expressed as a function of that portion of perimeter $p$ over which the segment extends, $a_p$  is the cross section area of the entire fluid path expressed as a function of perimeter $p$, and $1/f_c$  is the lens power of the buoyantly supported lens or lenses expressed in terms of their summed focal length, K  is the constant modifier of all optics preceding the buoyantly supported lens or lenses, the fluid bath will move the supported lens or lenses to achieve compensating deflection of light passing through the system against accidental angular motion.

An advantage of this stabilizer is that the fluid support system has virtually no static coefficient of friction or stiction and, consequently, produces immediate compensating lens motion of the buoyantly supported lens or lenses for minute accidental angular motions of the lens system.

A further advantage of this invention is that the fluid bath cushions and protects the neutrally supported lens or lenses so that the stabilizing lens system is insulated from and insensitive to substantially all motion other than the undesired accidental angular motion.

An additional advantage of this invention is that the buoyantly supported optical element can be coupled with a biasing field, either mechanical or magnetic, to provide for panning of the stabilizer system.

An additional object of this invention is to disclose a lens system attached to the casing which in cooperation with the buoyantly supported lens or lenses effectively cancels the off-axis curvature of field of the moving lens elements.

A further object of this invention is to disclose a plurality of fluid circuits for supporting and moving the lens or lenses relative to the optical axis so that accidental angular motion in both pitch and yaw can be compensated.

A still further advantage of this system is that by the expedient of reversing the magnification of the lens or lenses relative to the entering light, the fluid circuit can be designed to run either in front of or behind the received light entering the lens system.

A further advantage of this invention is that a single fluid circuit can be adapted to support the lens or lenses at two points along the optical path, and move the supported elements relative to one another so that the elements provide complementary stabilizing deflection.

Other objects, features and advantages of this invention will become apparent as the following specification progresses, reference being had to the accompanying drawings for an illustration of preferred embodiments of this invention.

FIG. 1b is an expanded side elevation section in the vicinity of the supported and confined lens elements of FIG. 1a;

FIG. 7b is a partial section taken along lines 7b—7b of FIG. 7a illustrating attachment of the moving elements by wires tensioned under a magnetic bias; and, FIG. 8 is a sectional view illustrating an embodiment of this invention having no conditioning lenses.

Figure 1A:
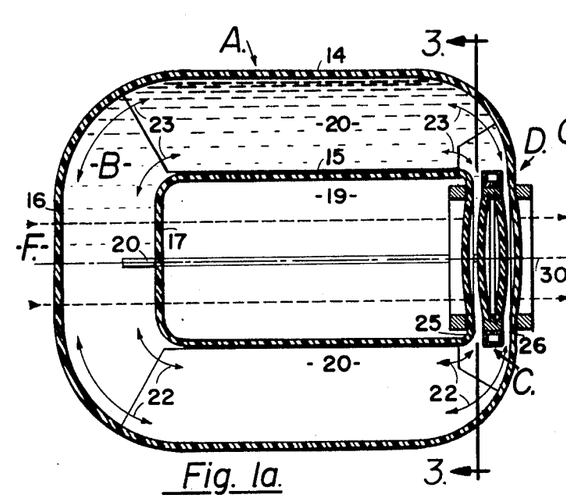
FIG. 1a is a side elevation section of this invention parallel to the optic axis showing a casing for confining a bath into two intersecting fluid circuits with neutrally buoyant lens elements supported and confined at the common intersection of the circuits.
Figure 1B:
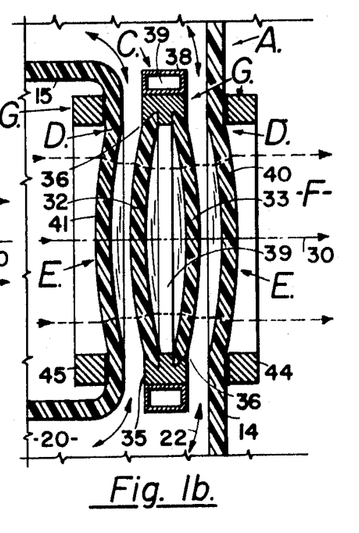
Figure 2:
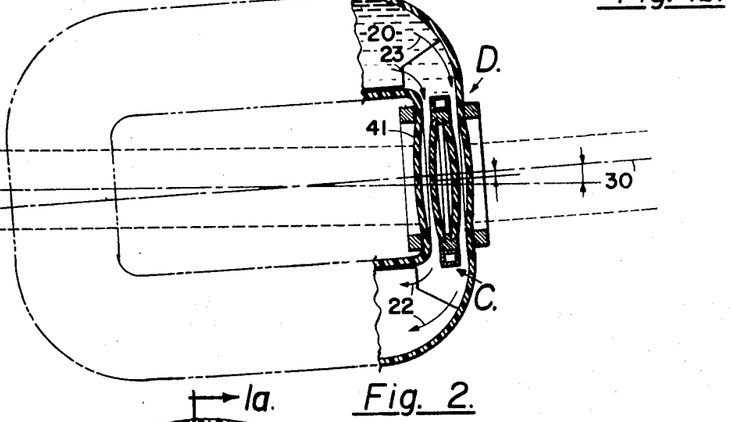
FIG. 2 is a section along lines 2—2 of FIG. 1a illustrating the passages in the casing through which the fluid flows in each circuit.

With reference to FIGS. 1a, 1b and 2, the stabilizer of this invention is illustrated. Casing A is shown enclosing a fluid bath B in which buoyantly supported lens elements C are supported. Lenses or lens elements C are maintained within casing A at lens-supporting housing D, which housing prevents movement of the lenses C within the casing A beyond certain preselected limits. Lens supporting housing D is here shown having sidewalls defined by conditioning lenses E, which lenses E serve to collimate light F stabilized through the lens system. A magnetic bias provided by magnets G serves to maintain buoyantly supported lens elements C in a neutral translational position within lens supporting housing D and simultaneously provides the bias which will permit panning of the lens system.

In operation, the lens system is mounted to camera optics, telescopes, or the like (not shown) for stabilization of entering light against accidental angular motion. When the lens system undergoes angular motion, either in yaw or pitch, the momentum of fluid bath B will cause buoyantly supported lenses C to be displaced out of coaxial position relative to conditioning lenses E. The optic deflection of lenses C will produce on the entering light an optic deflection substantially equal and opposite to the deflection of the accidental angular motion producing stabilization.

Casing A, as shown in FIGS. 1a and 1b, is circular in section having cylindrical and concentric outside walls 14 and inside walls 15. Walls 14 at its end removed from elements C is covered with a circular and transparent wall 16. Similarly, wall 15 at its end removed from elements C is covered with a circular and transparent wall 17. These walls 14, 15, 16 and 17 provide bath B with a circuitous path around an inner void 19 defined between wall 17, lens-supporting housing D and interior of inside wall 15. Transparent walls 16 and 17 permit the entering light F to pass through the fluid circuit within casing A to the stabilizing lens elements C. Commonly, the entire casing A will be made of transparent material such as clear plastic and the like.

With specific reference to FIGS. 1a, b and 2, it can be seen that concentric walls 14 and 15 have extending therebetween four partitions 20. Partitions 20 commence proximately at the plane of transparent wall 17 and extend forwardly of the casing in the direction of lens-supporting housing D terminating at the forward lens housing wall 25. These passageways are here shown spaced radially about the axis 30 of the lens housing at 90° intervals. The passageways defined by these partitions provide two separate fluid flow paths 22 and 23. These flow paths have circuitous paths parallel to the axis 30 of the lens system which each path having generally orthogonally intercepting axes crossing normally to the optic axis 30 at lens supporting housing D.

Fluid bath B is a transparent fluid composed of glycerin, alcohol, water, or the like. This bath functions to allow light to pass therethrough and at the same time has a relatively low fluid viscosity which provides fluid flow to produce compensating motion of buoyantly supported lens elements C within casing A. Preferably, the transparent portions of the housing, lens elements and the fluid bath are chosen so that their respective refractive indices provide minimum chromatic abberation. Further, the viscosity of the fluid can be chosen to provide optimum damping of the system.

Buoyantly supported lens elements C are located within lens-supporting housing D. These lens elements 32 and 33 each comprise transparent optical material such as plastic, glass or the like and are formed so as to be concave in configuration in the interior. These lenses are both divergent with respect to light F.

Lens elements C can be two or more lenses in combination. Alternately, lens elements C can be combined into a single lens, the only limitation being that the power of the lenses or lens conform to the formulation hereinafter described. Lenses 32 and 33 are glued or otherwise secured interior of a ring 35. Ring 35, typically of a magnetic material, is here shown T-shaped in cross section. This T-shape furnishes each lens with a support surface 36 on which each lens is secured. Peripherally about ring 35 there is a buoyancy ring 38, which ring has one or more voids 39 to enable mass to be added to or taken away from the lens elements C to obtain neutral buoyancy within the supporting fluid.

The interior of lens elements C between lenses 32 and 33 may be filled with transparent fluid. Where the spatial interval defined between the lenses is considerable, it will be desired to fill this area with transparent fluid similar to that of fluid bath B. Alternately, this interval may be filled with transparent material or in some cases by a vacuum.

Lens elements C preferably are defined to have their center of gravity and center of flotation coincident. This coincidence prevents the buoyantly supported elements from tumbling or undergoing angular motion in the fluid of bath B when the lens system is angularly displaced.

Attached to the front housing wall 25 there is a first conditioning lens 41. Similarly attached to rear housing wall 26 there is a second conditioning lens 40. These lenses take part in compensation of field tilt of the stabilizer system as well as diverging and converging the light from its received and emanated collimated state. Additionally, and as will hereinafter more fully appear with reference to FIG. 6, these lenses serve to compensate for the off-axis curvature of field of the stabilizing lens system here illustrated.

It will be seen that lenses 40 and 41 overlie lenses 32 and 33 of the buoyantly supported lens elements C. Simultaneously, lenses 40 and 41 form transparent sidewalls of casing A. In this disposition, the lenses form an integral portion of the lens-supporting housing D. Alternately, the sidewalls of casing A can be mere planar and transparent surfaces with a lens or lenses separate from the housing confining the light to a desired collimated divergent or convergent path.

Lens elements C are maintained in a neutral position by a biasing magnetic field. This field is produced by outer magnetic rings 44 and 45 affixed to front housing wall 25 and rear housing wall 26, respectively. Rings 44 and 45 are of an overall diameter wherein they encircle entirely the lens elements C and E providing a path through which light bundle F can pass. Complementary to rings 44 and 45, there is a magnetic ring 35 attached to the buoyantly supported lens elements C. Assuming that there is no angular motion, this ring is captured by the attractive magnetic fields of rings 44 and 45 to move the lens elements C through the bath to a buoyantly supported neutral position interior of casing A.

Some movement of buoyantly supported lens elements C parallel to optic axis 30 will occur. Commonly, the biasing magnetic field will pull the buoyantly supported lens element adjacent front wall 25 or alternately adjacent rear wall 26. This movement has been found to have little overall effect on the magnification of the stabilizing lens system.

Lens elements C are further restricted in their motion by partition 20 extending across the end of lens-supporting housing D. These partitions as placed across the interval between front housing wall 25 and rear housing wall 26 contact lens elements C when they move beyond lens supporting housing D.

It will be noted that the fluid flow path defined interior of casing A has rounded corners at the places where the walls are joined. This rounding of the corners prevents turbulent flow of fluid bath B, causing a preferred and predictable laminar flow of the fluid for effecting compensating movement of the lens elements C across the optic axis of the lens system.

Figure 3:
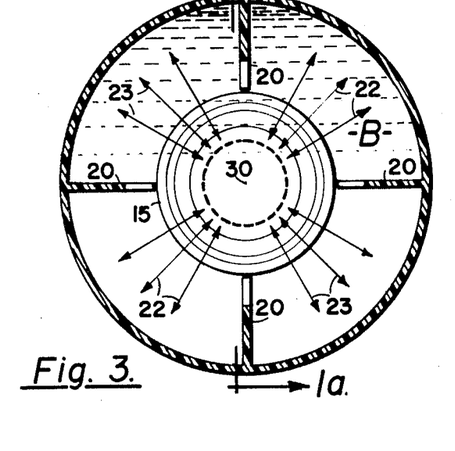
FIG. 3 is a side elevation section similar to FIGS. 1a and 1b showing the stabilizer inclined by accidental angular motion with the buoyantly supported optical elements displaced above the optic axis by the moving fluid bath.

With respect to FIG. 3, the operation of the lens system can be illustrated. When the housing is tilted an angle $\theta$, it is desired that the light deflection produced by lens elements C be equal and opposite to the angular deflection of the housing. Accordingly, it is necessary that the optic deflection of lens elements C and the fluid deflection of lens elements C be balanced according to the following relation $$1 = 2AK \div f_c \oint_0^p \frac{a_1}{a_p} dp$$

where

P    is the perimeter of the fluid circuit,

A    is the area enclosed by the perimeter of the fluid circuit projected into a plane including the optic axis and extending parallel to the direction of fluid flow in the segment in which the lens element is supported, $a_l$ is the area of the fluid circuit in the vicinity of the supported lens or lenses expressed as a function of that portion of perimeter $p$ over which the segment extends, $a_p$ is the cross section area of the entire fluid path expressed as a function of perimeter $p$, and $1/f_c$ is the combined power of the moving optical elements added according to the formula $$\frac{1}{f_c} = \frac{1}{f_1} + \frac{1}{f_2}$$

$K$ is the constant modifier of all optics preceding the moving optical element or elements.

where:

$f_1$ is the focal length of the first element 32 and $f_2$ is the focal length of the second element 33.

A table of parameters including values representative of middle, low and high ranges, respectively which will satisfy the above equation is as follows

[Dimensions in arbitrary units, K taken as unity]

| Average depth of fluid circuit | Average width of fluid circuit | Lens leg cross section (a function of $a_1$) | Remaining leg cross section (a function of $a_p$) | $f_c$ | A |
|---|---|---|---|---|---|
| 1 | 1 | 1/4 1/4 | 1/2 4/5 | 1 | 1 |
| 1 | 2 | 1/4 1/4 | 1/2 2/5 | 1 | 2 |
| 2 | 1 | 1/4 1/4 | 1/2 2/3 | 1 | 2 |
|   |   |   | 1/2 8/5 | 1 | 2 |

Analysis of the lens movement will produce several observations. First, it is preferred that the width of the fluid circuit be approximately the same as the length of the fluid circuit and that the circuit have either a square or circular configuration parallel to axis 30. It will be observed by analysis of the above equation that increases in the fluid path tending to elongate either the total width of the fluid circuit with respect to its length or the total length of the fluid circuit with respect to its width will cause the equation of fluid motion to produce increasingly smaller increments of fluid and lens motion for expansions of the fluid circuit in width or length, respectively.

Secondly, it is preferred to decrease the area of the fluid flow path in the vicinity of the supported lens. This decrease in area causes amplified movement of the supported lens elements C for small angular movements of casing A. This amplification occurs because the bulk of the fluid circuit confined outside of lens-supporting housing D drives the relatively small mass of fluid within lens supporting housing D. For example, where the area of the fluid path in the vicinity of the lens housing D along one-quarter of the fluid path is one-half of the area of the remaining portions of the fluid circuit, angular deflection of the housing will result in increased and amplified lens movement approximately eight-fifths times of that case where the area of the fluid path is constant throughout the circuit.

In my copending application entitled ACCIDENTAL-MOTION COMPENSATION FOR OPTICAL DEVICES, Ser. No 652,325, filed July 10, 1967, now U.S. Pat. No. 3,473,861 I have described how stabilization for producing a camera image differs from that stabilization necessary for use with directly viewed optical devices such as binoculars and the like Briefly stated, in the camera-type stabilization, for which the above-mentioned relation is derived, it is necessary that the light from the stabilizer of the optic system be parallel to axis 30. In optic stabilization, however, it is necessary that the central ray from the desired field of view exit parallel to the incident central ray. For directly viewed optical devices, the equation of motion for the optic system of this invention must be modified as follows:

$$1 \pm \frac{1}{M} = 2AK \div f_c \oint_0^p \frac{a_1}{a_p} dp$$

where $M$ is the overall magnification of the optic system to which the stabilizer is attached and the plus sign is for inverting optical systems and the minus sign is for erecting optical systems.

With respect to FIGS. 1a and 1b, it will be noted that the lenses through which the light bundle F passed were of positive power $1/f_c$. Additionally, it will be noted that the fluid circuit which caused the lens movement passed between the lens elements C and the entering light. In the practice of this invention, by the expedient of making the power $1/f_c$ negative and running the remainder of the fluid circuit behind the elements C, it is possible to cause the same optical stabilization. Such negative magnification and reversal of the fluid circuit is illustrated with reference to FIGS. 4a, 4b and 5, the example there being shown stabilizing converging light.

Figure 4A:
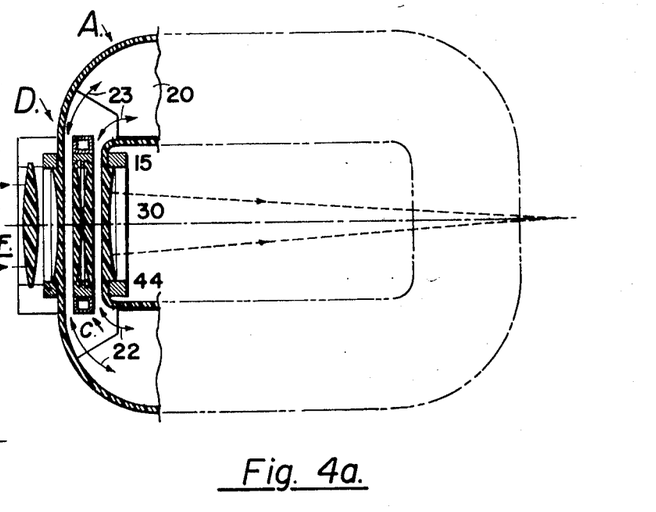
FIG. 4a is a side elevation section of an alternate embodiment of this invention illustrating a stabilizer containing moving lens elements of opposite powers to those shown in FIG. 1, these lenses being supported at the opposite end of the fluid bath in the path of convergent and focusing light.
Figure 4B:
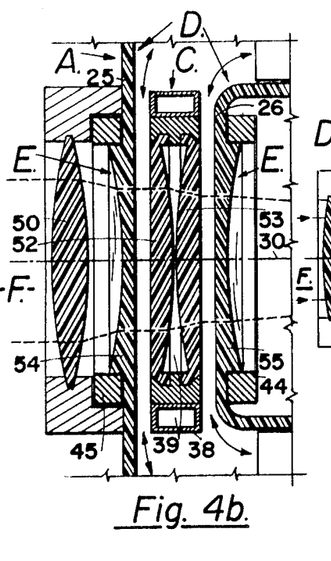
FIG. 4b is an enlarged side elevation section of FIG. 4a taken in the vicinity of the supported lens elements.

With reference to FIGS. 4a and 4b, a casing A having a fluid bath B essentially identical to that illustrated in FIGS. 1a through 3 is shown. In the stabilizer illustrated light passes first through the stabilizing elements C and thereafter through the remaining portion of the fluid circuit of contained bath B. It will be noted, that the powers of the lenses are reversed with respect to the example of FIGS. 1a-3.

Lens elements C are two planoconvex lenses 52 and 53 faced with their convex surfaces adjacent one another. These lenses are fastened to rings 35 in a manner similar to the attachment previously illustrated in FIGS. 1 and 3. The plane surfaces of each lens is exposed to fluid bath B.

Lens supporting housing D includes as the sidewalls of lens-supporting housing D two planoconcave lenses 54 and 55. Lenses 54 and 55 are mounted to walls 25 and 26 of casing A, respectively. As mounted, the lenses have their plane surfaces exposed to the fluid of the bath.

It will be observed that by exposing the plane surfaces of lenses 52, 53, 54 and 55 to fluid bath B, the cross section of the fluid circuit through the lens supporting housing D is maintained constant. This constant cross section provides uniform and linear movement of the lens elements C within casing A directly proportional to angular movements of the stabilizer.

Figure 5:
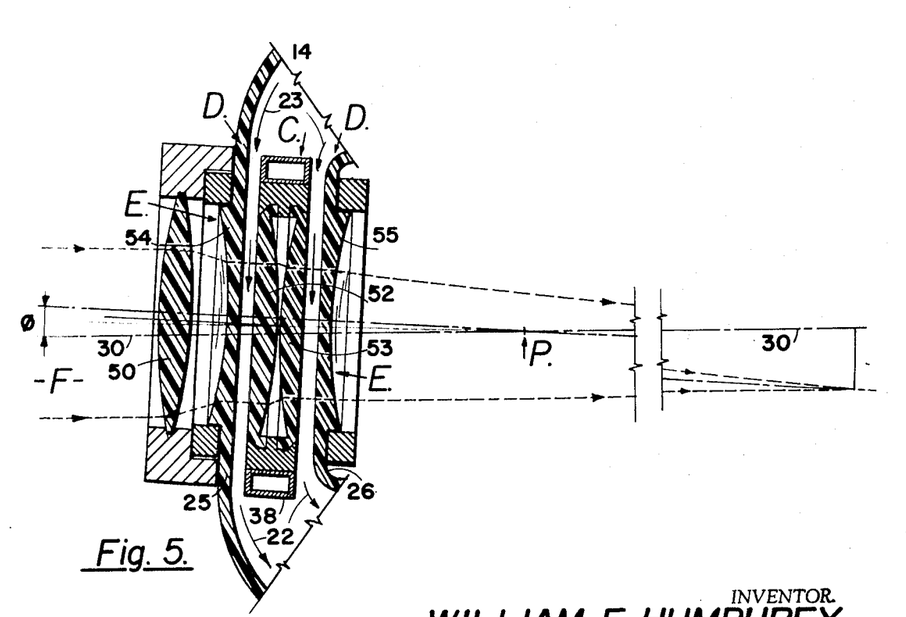
FIG. 5 is an enlarged side elevation section in the vicinity of the supported lenses shown in FIGS. 4a showing the stabilizer inclined by the accidental angular motion with the buoyantly supported optical elements displaced below the optic axis by the moving fluid bath.

With respect to FIG. 5, the operation of the lens system is illustrated. Assuming that the housing is tilted an angle $\theta$, lens elements C moves transversely across the optical axis 30 relative to conditioning lenses E. The relative movement of these lens elements C and D will deflect light passing through the stabilizer in an equal and opposite direction to that caused by the angular deflection, provided that the fluid path and optics conform to the following equation $$1 = \left(\frac{d}{F_{obj}}\right) \times (2A) \div f_c \oint_0^d \frac{a_1}{a_s} dp$$

where $d$ is the distance between the stabilizing element and the focal plane of focusing lens 50 and $F_{obj}$ is the focal length of focal lens F.

It will be seen that the relation $(d/F_{obj})$ is the equivalent of a constant modifier to the mathematics of the preceding equation it should be apparent to those skilled in the optic art that other optics preceding the lens will produce other constants, the variables of this relation remaining unchanged. For example, in afocal optics the constant applied will vary in accordance with the magnification.

As compared to the lens movement of elements C illustrated in FIG. 3, it will be noted that lens elements C of FIG. 5 are moved in an opposite direction. This opposite movement results from the fluid circuit passing behind the stabilizing elements C relative to the entering light F. 0p It is noted that the stabilizer is here stabilizing convergent and focusing light. The stabilizer here shown can be used equally as well on divergent light. It has been found that where the stabilizer works in convergent light, greater deflection of the convergent rays is required to effect stabilization. Conversely, where the stabilizer works in divergent light, lesser deflection of the diverging rays is necessary to effect stabilization.

The stabilizer of this invention has the additional feature of preventing curvature of field when lens elements C are off-axis with respect to conditioning lenses E. Such curvature of field correction is achieved by selecting coincident focal planes for the adjacent lenses of lens elements C and E. Typically, lens 54 of conditioning lens E and lens 52 of lens elements C are given coincident focal planes. Likewise, lens 53 of lens elements C and lens 55 of conditioning lenses E are given coincident focal planes. This field compensating effect is best illustrated in the exploded schematic diagram of lens elements C and conditioning lens elements E shown in FIG. 6.

Figure 6:
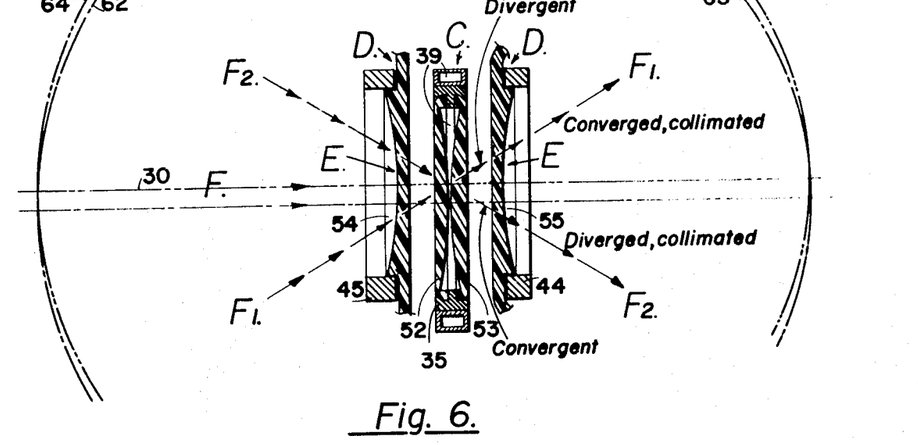
FIG. 6 is an exploded schematic diagram of the field of stabilizing lens elements of FIG. 5 illustrating the off-axis curvature of field direction correction obtainable with this invention.

With reference to FIG. 6, planoconcave lens 54 of conditioning lenses E is shown having a corresponding focal plane 64. Similarly, planoconvex lens 52 of lens elements C is shown having a focal plane 62. These focal planes are selected to overlie one another when lens elements C and conditioning lens E are in the neutral, coaxial position with respect to one another. When, however, lens elements C move off-axis with respect to conditioning lenses E, lens 52 will be off-axis with respect to lens 54. The respective fields 64 and 62 will no longer be coincident but will intersect one another along the section of their curved field shown in FIG. 6.

Similarly, planoconvex lens 53 of lens elements C is shown having a corresponding focal plane 63. Likewise, planoconcave lens 55 of conditioning lenses E is shown having a focal plane 65. These focal planes are selected to overlie one another when lens elements C and field lenses D are in the neutral position with respect to one another. When, however, lens elements C move off-axis with respect to conditioning lenses E, lens 53 will be off-axis with respect to lens 55. The respective focal planes 63 and 65 no longer will be coincident but will intersect one another along the section of their curved field shown in FIG. 6.

Assuming that collimated light $F_1$ passes through the lens system at an angle inclined with respect to the optic axis 30 (from the lower left to the upper right as illustrated in FIG. 6), it will be seen that lenses 54 and 52 will cooperate to diverge such light. Impingement of collimated light along path $F_1$ at lens 54 will cause the light to diverge. Similarly, impingement of the light on lens 52 will cause the light to converge. However, since the focal plane 64 of lens 54 lies in front of the focal plane 62 of lens 52, the divergent property of lens 54 will predominate and light passing between lenses 52 and 53 will be divergent.

The lens sequence and focal planes of lenses 53 and 55 will produce on the divergent light passing along path $F_1$ a convergent effect which is approximately equal and opposite to that produced by lenses 54 and 52. This convergent effect will converge the light and return it to a substantially collimated state.

Assuming that the diverging light between lenses 52 and 53 passes through lens 53 along the light path $F_1$, it will be seen that lenses 53 and 55 will cooperate to converge such light. Impingement of the diverging light along path $F_1$ at lens 53 will cause the light to converge. Similarly, impingement of the light on lens 55 will cause the light to diverge. However, since the focal plane 63 of lens 53 lies in the front of the focal plane 65 of lens 55, the convergent property of lens 53 will dominate, and the light will be collimated.

An analysis of collimated light passing along path $F_2$ will produce similar results, with the exception that the light between lenses 52 and 53 will be converged and thereafter diverged by lenses 53 and 55. Impingement of collimated light along path $F_2$ at lens 54 will cause the light to diverge. Conversely, impingement of the light on lens 52 will cause the light to converge. However, since the focal plane 64 of lens 54 lies behind the focal plane 62 of lens 52, the convergent property of lens 52 will predominate and the light passing between the lenses 52 and 53 will be convergent.

The lens sequence and focal planes of lenses 53 and 55 will produce on the convergent light passing along path $F_2$ between lenses 52 and 53 a divergent effect which is approximately equal and opposite to that produced by lenses 54 and 52.

Assuming that the convergent light between lenses 52 and 53 passes through lens 53 along the light path $F_2$, it will be seen that lenses 53 and 55 cooperate to converge such light. Since the focal plane 63 of lens 53 lies behind the focal plane 65 of lens 55, the divergent property of lens 53 will dominate and the light will again be collimated.

Figure 7A:
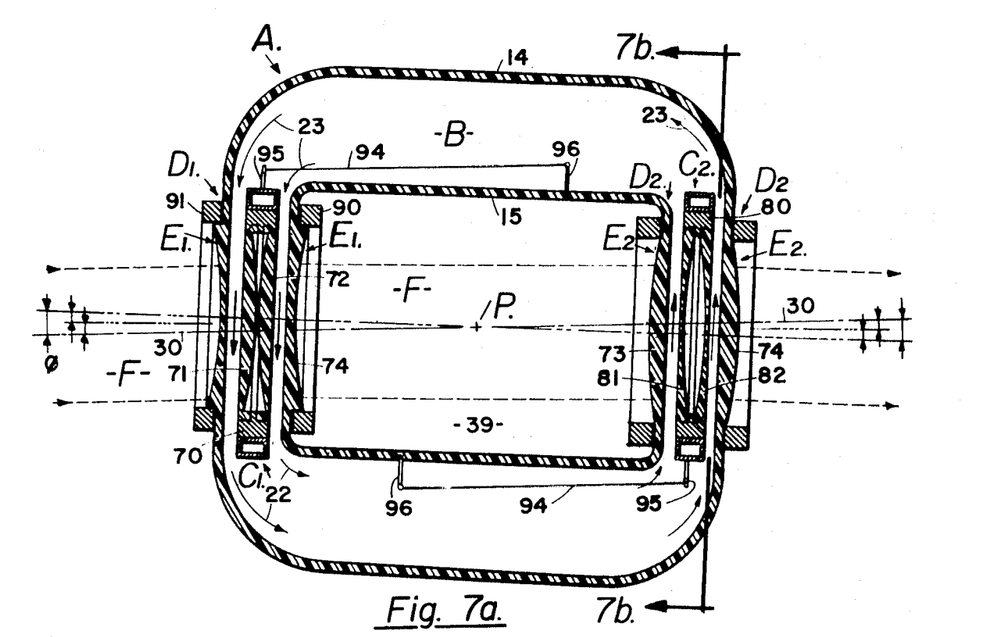
FIG. 7a is a stabilizer having paired moving elements supported and moved at opposite portions of the same fluid circuits to cause complementary stabilizing deflection of the collimated light.
Figures 7B, 8:
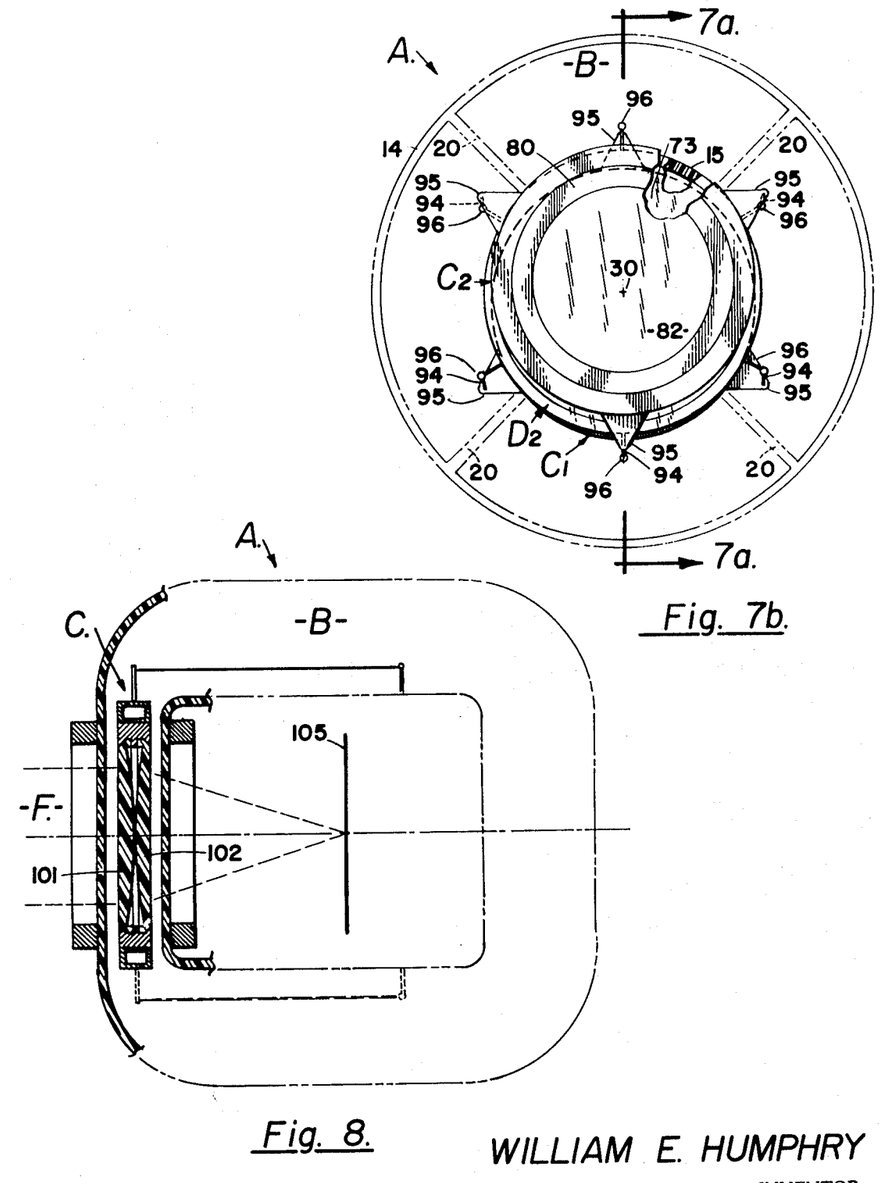

It is possible to construct a stabilizer according to this invention having two moving elements, each element operative to correct some of the deflection caused by accidental angular motion. With reference to FIGS. 7a and 7b, such a dual-element optical stabilizer is illustrated.

Referring to FIG. 7a, there is illustrated a casing A enclosing a bath B having two buoyantly supported lens elements $C_1$ and $C_2$. Lens elements $C_1$ are confined within a lens-supporting housing $D_1$ in the path of entering light F. Lens elements $C_2$ are supported in a lens-supporting housing $D_2$ in the path of the light F after it has been deflected by lens elements $C_1$. Elements $C_1$ and $C_2$ are supported by the same fluid bath B flowing through the casing A.

Lens elements $C_1$ are identical in configuration to those lenses previously illustrated in FIGS. 4a and 4b. Typically, a ring 70 has fastened thereto two planoconvex lenses 71 and 72. Conditioning lenses E comprise two planoconcave lenses 73 and 74. When casing A is angularly deflected, movement of elements $C_1$ occurs in a manner precisely analogous to that illustrated in FIG. 5.

Lens elements $C_2$ are opposite in configuration to those lenses previously illustrated in FIGS. 4a and 4b and are analogous in power to the lenses illustrated in FIGS. 1a through 3. Typically, a ring 80 has fastened thereto two planoconcave lenses 81 and 82. Conditioning lenses E comprise two planoconvex lenses 73 and 74. When casing A is angularly deflected, lens movement of elements $C_2$ occurs in a manner analogous to that illustrated in FIG. 3.

It will be noted that similar to the lens configuration illustrated in FIGS. 4a, 4b and 5, the plane surface of the lenses are all exposed to the fluid path. This maintains the fluid flow path of constant cross section and produces linear movement of the lens elements $C_1$ and $C_2$ with respect to their housings $D_1$ and $D_2$ directly proportional to the angular movement of casing A.

In operation, the elements $C_1$ and $C_2$ can be made to cooperatively deflect the light passing through the stabilizer system by conforming the fluid path and buoyantly supporting lens elements to the following relation:

$$1 = \left[ 2AK_1 \div f_{c_1} \oint_0^p \frac{a_{l_1}}{a_p} dp \right] - \left[ 2AK_2 \div f_{c_2} \oint_0^p \frac{a_{l_2}}{a_p} dp \right]$$

where:

$1/f_{c_1}$ is the combined power of the lens elements of $C_1$,
$1/f_{c_2}$ is the combined power of the lens elements of $C_2$,
$a_{l_1}$ is the area of the fluid circuit in the vicinity of lens elements $C_1$, and
$a_{l_2}$ is the area of the fluid circuit in the vicinity of lens elements $C_2$,
$K_1$ is the constant modifier of all optics preceding the first moving lens elements, and
$K_2$ is the constant modifier of all optics preceding the second moving lens elements.

A table of parameters including values representative of middle, low and high ranges, respectively which will satisfy the above equation is as follows:

[Dimension in arbitrary units, $K_1$ and $K_2$ taken as unity]

| Average depth of fluid circuit | Average width of fluid circuit | Lens leg cross section (a function of $a_l$) | Remaining leg cross section (a function of $a_p$) | $f_{c_1}$ | $-f_{c_2}$ | A |
| --- | --- | --- | --- | --- | --- | --- |
| 1 | 1 | ¼ | ¼ | 1 | 1 | 1 |
| 1 | 2 | ¼ | ½ | ½ | ½ | 2 |
| 2 | 1 | ¼ | ½ | ½ | ½ | 2 |

The lens elements $C_1$ and $C_2$ in their support by a single fluid path have an additional advantage. Typically, the stabilizer of this system will be used under conditions where variation in the temperature and consequently the density of the fluid bath B will occur. With such temperature and density variation, lens elements $C_1$ and $C_2$ will tend to sink with respect to their conditioning lenses $E_1$ can be precisely counterbalanced by lens elements $C_2$ sinking a corresponding amount with respect to its conditioning lens $E_2$. This lens sinking can produce compensating deflection between the two elements C, resulting in light F passing through the system being stabilized as in the case where no density variation occurred.

FIGS. 7a and 7b additionally disclose an alternate method for supporting lens elements $C_1$ and $C_2$ interior of the fluid bath. In the lens supports heretofore illustrated, magnetic rings 35 of the moving lens elements are illustrated as mutually attractive to magnetic rings 44 and 45 attached to the housing. While this arrangement serves to capture the moving lens elements in coaxial translational relation with respect to the conditioning lenses, it has the disadvantage of causing movement of the lens element C towards one or the other of the conditioning lenses. While such movement of the lens elements C along the optic axis does not interfere with the optic properties of the system, it can add friction and limit the compensating movement of lens elements C. This disadvantage is avoided by the embodiment shown in FIGS. 7a and 7b.

Referring to FIG. 7a, magnetic ring 90 affixed interior of the fluid bath housing is given a magnetic polarity which repels the magnetic material of ring 70. Conversely, magnetic ring 91, attached to the outside housing of the stabilizer, is given a polarity which attracts the magnetic material of ring 70. It will thus be seen that the lens element $C_1$ is biased towards the outside of the housing.

Opposing this bias there are attached three flexible strands 94. Strands 94 are fastened at one end to wires 95 protruding radially outward at 120° intervals about lens element $C_1$. At the other end, strands 94 fasten to radially extending wires 96 fastened to wall 15. These wires oppose the magnetic bias and suspend lens element $C_1$ within the fluid bath. As the lens element is supported between the two walls of the fluid circuit, no frictional contact can occur and thus the movement of lens element $C_1$ will follow the movement of bath B in a substantially frictionless motion. Lens element $C_2$ is illustrated supported in a precisely analogous fashion.

Referring further to FIG. 7b, it will be noted that the casings include four walls 20 dividing the flow of bath B into two separate circuitous paths. In practice it will be found that the number of circuitous paths is not important so long as the components of fluid flow combine to produce deflection of lens elements C in X and Y axes at lens-supporting housing D.

It will be noted that it is possible to construct the stabilizer of this invention without using conditioning lenses E. Such a construction is illustrated in FIG. 8.

Referring to FIG. 8, lens elements C are illustrated including two planoconvex lenses 101 and 102 affixed interior of a ring similar to that previously illustrated. Each of the planoconvex lenses is mounted with its planar surface exposed outwardly to bath B.

Planoconvex lenses 101 and 102 are here shown chosen so that their combined focal length is coincident with a focal plane 105 which is normal to the light F entering the stabilizer and intersects the central point of the fluid circuit. As in the case of the previous examples, the mathematical formalism already developed will cover this system.

This system, while comprising a simplification of the invention illustrated thus far has several disadvantages. First, the system will be sensitive to movement of the lens element C towards and away from focal plane 105. Secondly, the focal length of the lenses must be relatively large as the floating elements can only include a simple lens or simple lens system.

On the positive side, the construction shown in FIG. 8 will be invarient to translation of the lens to the extent that the lens has a reasonable performance over a flat field. This is because the translated lens has the same geometry in its stabilized position except for the translation of its axis. This is not the case in the lens system illustrated in FIG. 6.

It should be noted that similar to the example of FIGS. 7a and 7b, the back chamber can also contain a stabilizing lens, which should be negative if the primary image from the front lens is beyond the back of the fluid circuit. If the primary image is before the back of the fluid circuit, the back lens should be positive.

These and other modifications of my invention may be practiced, it being understood that the form of my invention as described above is to be taken as a preferred example of the same. Such description has been by way of illustration and example for purposes of clarity and understanding. Changes and modifications may be made without departing from the spirit of my invention.

I claim:

1. A lens system for producing stabilization of the apparent angular deviation of light passing through said system substantially along an optic axis caused by accidental angular motion of said optic axis, said system comprising: a transparent fluid bath; a casing for confining said transparent fluid bath along at least two paths combining to provide components of fluid flow each orthogonal to said optic axis and intersecting said optic axis at a common point, at least one lens means, means neutrally buoyantly supporting said lens means within said bath at said common point whereby said lens means moves with said fluid flow during angular motion of said casing; and means for biasing said lens means to a position at said common point through said fluid bath.

2. The lens system according to claim 1 and wherein: said casing defines fluid paths having components of fluid flow intersecting at two common points along said optic axis; and including two lens means; one of said lens means neutrally and buoyantly supported at one of said common points and the other of said lens means neutrally and buoyantly supported at the other of said common points.

3. A lens system according to claim 1 and wherein each of said fluid paths are circuitous.

4. A lens system according to claim 1 and wherein said light path intersects said casing and said casing is transparent at said intersection only.

5. A stabilizing lens system for deflecting light passing substantially along an optic axis comprising in combination: a transparent fluid bath; a casing for confining said transparent fluid bath along a circuitous path having a segment of said path intersecting said optic axis to provide a component of fluid flow substantially normal to said optic axis; lens means adapted for buoyant and neutral support within said bath; means for defining in said lens system a light path along said optic axis through said segment substantially normal to said axis of said fluid path; means for confining said lens means to a preselected range of movement within said fluid bath at said segment for deflecting light traveling along said path; and means for biasing said lens means through said fluid bath to a preselected position within said segment.

6. The invention of claim 5 and wherein said casing confines said bath to a plurality of fluid paths, said plurality of paths providing intersecting components of fluid flow along axes each normal to said optic axis at said segment.

7. The invention of claim 5 and wherein said fluid circuit has its circuitous fluid path extending in front of said segment relative to light entering said stabilizer.

8. The invention of claim 5 and wherein the cross section of said fluid path outside of said segment is greater than the cross section of said fluid path within said segment.

9. The invention of claim 5 and wherein confining means includes means for magnetically biasing said lens means through the fluid of said bath to a neutral position within said segment.

10. A lens system for producing stabilization along at least an axis of the apparent angular deviation of an image produced by accidental angular motion, said system comprising: a transparent fluid bath; at least one lens means of power $1/f_c$ adapted for neutral and buoyant support within said bath; a casing for confining said transparent fluid bath along at least one circuitous path having at least one segment of fluid flow parallel to said axis and intersecting the optic axis of said lens system; transparent walls affixed to said casing for permitting light to pass therethrough substantially along said optic axis; said circuitous fluid path having a perimeter $p$ enclosing an area $A$ when said perimeter $p$ is projected on a plane including said optic axis and parallel to said axis, said circuitous fluid path having a cross section of fluid flow $a_p$ expressed as a function of said perimeter $p$; means for confining said lens means as supported within said bath for movement with said bath along said segment of said circuitous path, said segment having a cross section of fluid flow $a_1$ expressed as a function of that portion of said perimeter $p$ along which said segment is disposed; means for biasing said lens means to a preselected neutral position along said segment of said circuitous path; and said power $1/f_c$, perimeter $p$, area $A$, cross section of fluid flow $a_p$ and $a_1$ all related by the equation $$1 = 2KA \div f_c \oint_0^p \frac{a_1}{a_p} dp$$

where $K$ is the constant modifier of all optics preceding said lens system.

11. The invention of claim 10 and wherein: said casing confines said bath to a plurality of intersecting fluid paths, each of said paths having a segment of fluid flow intersecting said optic axis and all of said paths at their respective segments combining to produce movement of said bath along each orthogonal to said optic axes and to one another.

12. The invention of claim 10 and wherein said fluid circuit has its circuitous fluid path extending in front of said segment relative to light entering said stabilizer.

13. The invention of claim 10 and wherein said lens system further includes: objective lens means for focusing light passing through said lens system of focal length $F_{obj}$; said lens means of power $1/f_c$ supported a distance $d$ from the focal plane of said objective lens means; and said focal length $F_{obj}$ and distance $d$ combine to change said constant modifier $K$ to result in the modified equation:

$$1 = \left[\frac{d}{F_{obj}}\right][2A] \div f_c \oint_0^p \frac{a_1}{a_p} dp$$

14. The invention of claim 10 and wherein at least one of said transparent walls is a lens.

15. The invention of claim 10 and wherein said lens means includes deflecting lenses of opposite magnification; conditioning lens means including two transparent walls disposed on either side of said deflecting lenses, one of said walls including a conditioning lens having a focal plane coincident with one of said deflecting lenses and the other of said walls including a conditioning lens having a focal plane coincident with the other of said deflecting lenses when said deflecting lenses and conditioning lenses are in coaxial relation.

16. The invention of claim 10 and wherein: first lens means of power $1/f_{c1}$; second lens means of power $1/f_{c2}$; a first segment of said circuitous fluid path having the bulk of said fluid conduit extending behind said segment relative to entering light, said segment having a cross section of fluid flow $a l_1$ expressed as a function of that portion of perimeter $p$ along which said segment is disposed; a second segment of said circuitous fluid path having the bulk of said fluid circuit extending in front of said segment with respect to entering light, said segment having a cross section of fluid flow $a l_2$ expressed as a function of that portion of perimeter $p$ along which said segment is disposed; first means for confining said first lenses as supported within said bath for movement within said bath along said first segment of said circuitous path; means biasing said first lens through the fluid of said bath to a preselected point within the first segment of said circuitous path, second means for confining within said bath along said second segment of said circuitous path, means for biasing said second lenses through the fluid of said bath to a second point along the second segment of said circuitous path, and said powers $1/f_{c1}$ and $1/f_{c2}$ and cross-sectional areas $a_{l_1}$ and $a_{l_2}$ all being related by the modified equation:

$$1 = \left[2AK_1 \div f_{c1} \oint_0^p \frac{a_{l_1}}{a_p} dp\right] - \left[2AK_2 \div f_{c2} \oint_0^p \frac{a_{l_2}}{a_p} dp\right]$$

where $K_1$ is the constant modifier of all optics preceding the first lens means of power $1/f_{c1}$ and $K_2$ is the constant modifier of all optics preceding the second lens means of power $1/f_{c2}$.

17. The invention of claim 10 and wherein: said lens system has an overall magnification of $M$ and said equation is further modified by the relation:

$$1 \pm \frac{1}{M} = 2AK \div f_c \oint_0^p \frac{a_1}{a_p} dp$$

where said minus sign ($-$) is for erect image optical systems and said plus sign ($+$) is for inverting image optical systems.

18. In combination: a transparent fluid bath; a casing for confining said transparent fluid bath to a circuitous fluid path, said circuitous fluid path having a first segment crossing an optic axis and a second segment with a component of fluid flow parallel to said optic axis; at least one lens means buoyantly and neutrally supported within said bath at said first segment; means for delimiting movement of said lens means with said fluid bath at said first segment to preselected limits relative to said optic axis; means for biasing movement of said lens means through said fluid bath to a neutral position within said first segment; transparent wall means in said casing along said optic axis for permitting light to pass along said optic axis, through said casing and said lens means; said lens means and circuitous fluid path constructed and arranged to conform to the equation:

$$1 = 2AK \div f_c \oint_0^p \frac{a_1}{a_p} dp$$

where:
$1/f_c$     is the power of said lens means;
$p$     is the perimeter of said fluid path;
$a_l$     is the cross-sectional area of said circuitous fluid path expressed as a function of perimeter $p$
$a_p$     is the cross-sectional area of said segment of said circuitous fluid path expressed as a function of that portion of said perimeter $p$ over which said segment is located;
$A$     is that area defined by the projection of the perimeter projected onto a plane parallel to the direction of fluid flow of said segment and including the plane of said optic axis; and,
$K$     is the constant modifier of all optics preceding said lens means.

19. The invention of claim 18 and wherein said second segment of said circuitous fluid path is between first segment of said path and light entering said lens, and said lens is of positive power.

20. The invention of claim 18 and wherein said second segment of said circuitous fluid path is between the first segment of said path and light emanating from said lens, and said lens is of negative power.

21. The invention of claim 18 and wherein the cross section of fluid flow $a_p$ outside of the cross section of fluid flow $a_l$ is greater than $a_l$.

22. The invention of claim 18 and wherein said circuitous fluid path has an effective component of fluid parallel to said optic axis approximately equal to the component of fluid flow across said optic axis.

* * * * *